(12) United States Patent
Lee et al.

(10) Patent No.: US 12,272,794 B2
(45) Date of Patent: Apr. 8, 2025

(54) ELECTRODE ASSEMBLY STACKING FAULT DETECTION METHOD, ELECTRODE ASSEMBLY INCLUDING INSULATING MEMBER, AND BATTERY CELL INCLUDING SAME

(71) Applicant: LG Energy Solution, Ltd., Seoul (KR)

(72) Inventors: Suk Woo Lee, Daejeon (KR); Su Hyun Yun, Daejeon (KR); Dong Sik Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 459 days.

(21) Appl. No.: 17/775,678

(22) PCT Filed: Sep. 23, 2021

(86) PCT No.: PCT/KR2021/012953
§ 371 (c)(1),
(2) Date: May 10, 2022

(87) PCT Pub. No.: WO2022/075637
PCT Pub. Date: Apr. 14, 2022

(65) Prior Publication Data
US 2022/0376305 A1  Nov. 24, 2022

(30) Foreign Application Priority Data
Oct. 8, 2020 (KR) .................. 10-2020-0129936

(51) Int. Cl.
*H01M 10/0585* (2010.01)
*G01B 21/08* (2006.01)
(Continued)

(52) U.S. Cl.
CPC ........ *H01M 10/0585* (2013.01); *G01B 21/08* (2013.01); *H01M 10/0413* (2013.01); *H01M 10/0436* (2013.01); *H01M 10/48* (2013.01)

(58) Field of Classification Search
CPC ........ H01M 10/0585; H01M 10/0413; H01M 10/0436; H01M 10/48; H01M 10/052; G01B 21/08; Y02E 60/10; Y02P 70/50
See application file for complete search history.

(56) References Cited

U.S. PATENT DOCUMENTS

| | | |
|---|---|---|
| 2012/0115018 A1 | 5/2012 | Kawaoka et al. |
| 2013/0004814 A1 | 1/2013 | Ohashi et al. |

(Continued)

FOREIGN PATENT DOCUMENTS

| | | |
|---|---|---|
| CN | 101971407 A | 2/2011 |
| CN | 102804474 A | 11/2012 |

(Continued)

OTHER PUBLICATIONS

International Search Report for Application No. PCT/KR2021/012953 mailed Jan. 6, 2022, pp. 1-3.
(Continued)

*Primary Examiner* — Abdullah A Riyami
*Assistant Examiner* — Nader J Alhawamdeh
(74) *Attorney, Agent, or Firm* — Lerner David LLP

(57) ABSTRACT

A method of detecting a lamination defect of an electrode assembly in the initial stage, including: forming an insulating member having a predetermined width and a predetermined height in an overhang region of one end or two ends of one surface of a negative electrode; manufacturing an electrode assembly by sequentially laminating a separator and a positive electrode on one surface of the negative electrode; and determining whether there is a lamination defect in the electrode assembly by measuring a thickness of the electrode assembly. Also provided are an electrode assembly including an insulating member, and a battery cell including the electrode assembly.

18 Claims, 9 Drawing Sheets

(51) Int. Cl.
*H01M 10/04* (2006.01)
*H01M 10/48* (2006.01)

(56) References Cited

U.S. PATENT DOCUMENTS

| | | | |
|---|---|---|---|
| 2015/0147629 A1* | 5/2015 | Kim | H01M 10/4235 |
| | | | 429/246 |
| 2017/0069905 A1 | 3/2017 | Koike | |
| 2018/0241026 A1 | 8/2018 | Shibutani et al. | |
| 2019/0273224 A1* | 9/2019 | Yun | H01M 4/66 |
| 2020/0185663 A1 | 6/2020 | Saito et al. | |
| 2021/0050626 A1 | 2/2021 | Kim et al. | |
| 2022/0376305 A1* | 11/2022 | Lee | H01M 10/48 |
| 2023/0113914 A1* | 4/2023 | Min | H01M 50/105 |
| | | | 429/90 |

FOREIGN PATENT DOCUMENTS

| | | |
|---|---|---|
| CN | 104904053 A | 9/2015 |
| CN | 106033823 A | 10/2016 |
| CN | 111373595 A | 7/2020 |
| JP | 2011039014 A | 2/2011 |
| JP | 4986450 B2 | 7/2012 |
| JP | 2015056295 A | 3/2015 |
| JP | 2016081558 A | 5/2016 |
| JP | 6024629 B2 | 11/2016 |
| JP | 2017054587 A | 3/2017 |
| JP | 2017135019 A | 8/2017 |
| JP | WO2017043178 A1 | 6/2018 |
| JP | 6350909 B2 | 7/2018 |
| JP | 6589663 B2 | 10/2019 |
| JP | 2020030953 A | 2/2020 |
| JP | 6703416 B2 | 6/2020 |
| JP | 2020085690 A | 6/2020 |
| JP | 2020095836 A | 6/2020 |
| KR | 101729815 B1 | 4/2017 |
| KR | 101735157 B1 | 5/2017 |
| KR | 20170024498 A * | 7/2017 ........ H01M 10/4285 |
| KR | 20170120778 A | 11/2017 |
| KR | 20190085403 A | 7/2019 |
| KR | 20190091745 A | 8/2019 |
| KR | 102107226 B1 | 5/2020 |
| KR | 20200059838 A | 5/2020 |
| KR | 20200073381 A | 6/2020 |
| KR | 20200114408 A | 10/2020 |

OTHER PUBLICATIONS

Extended European Search Report including Written Opinion for Application No. 21877889.2 dated May 16, 2024, pp. 1-8.

* cited by examiner

[FIG. 1]
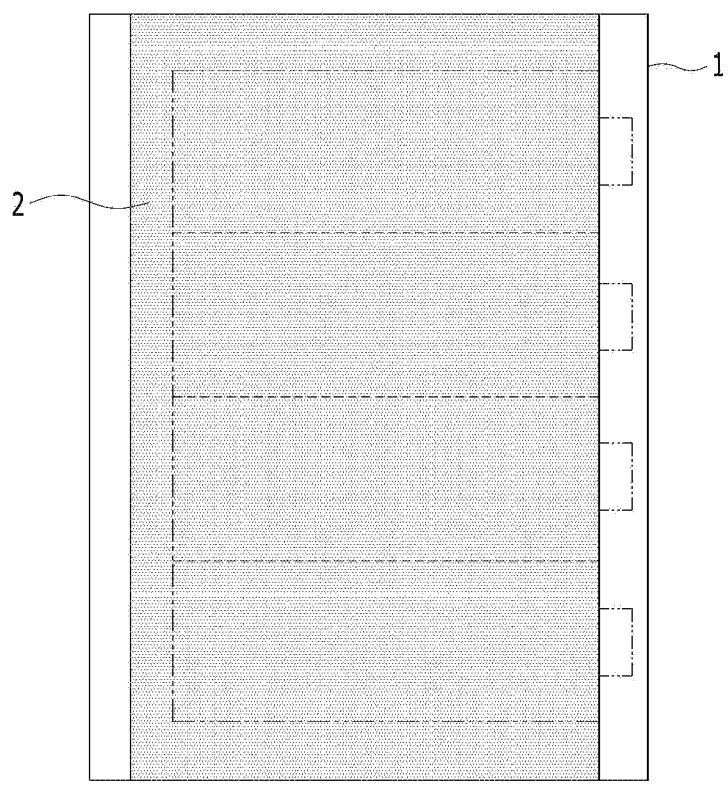

【FIG. 2a】
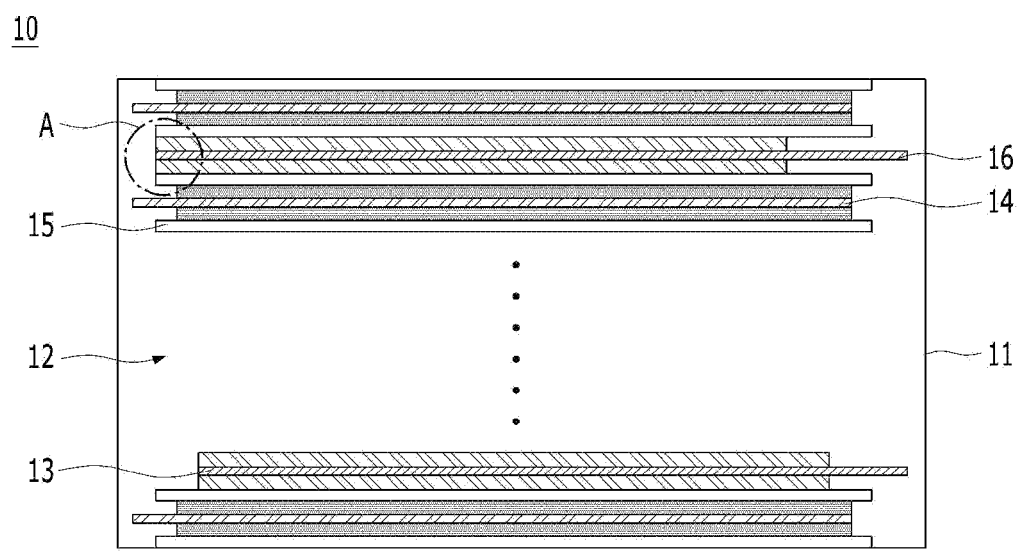

[FIG. 2b]
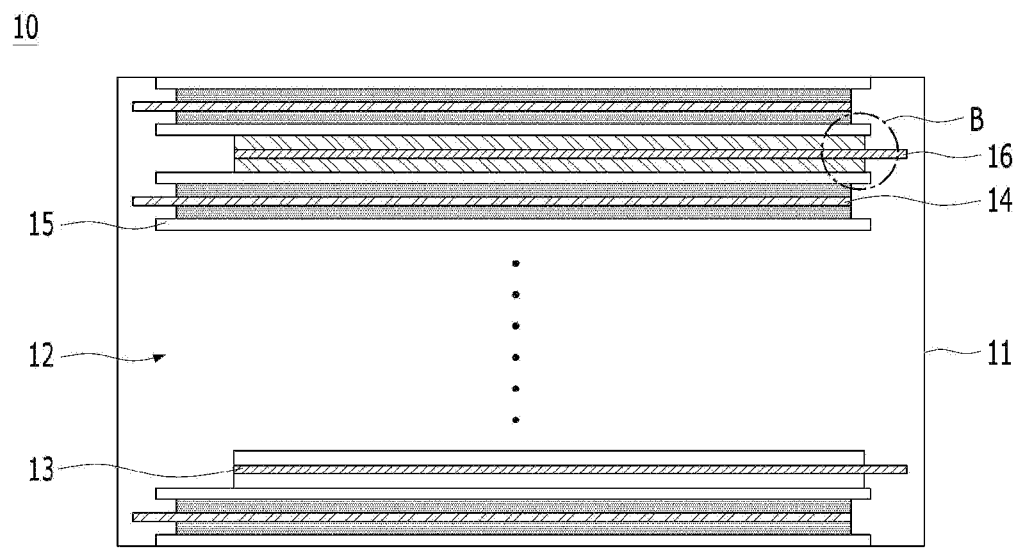

[FIG. 3]
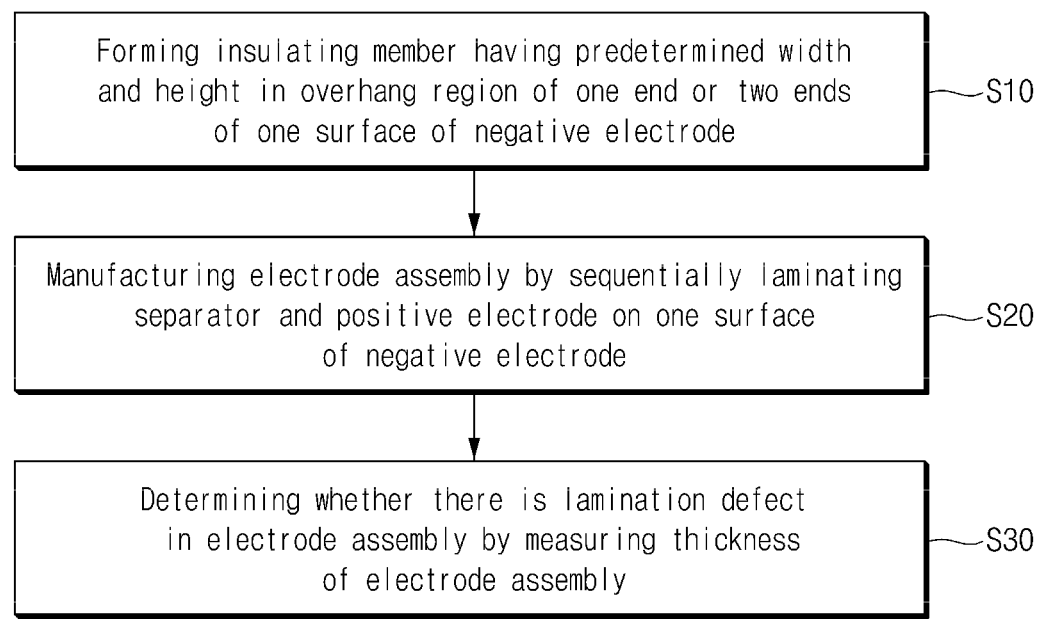

[FIG. 4]
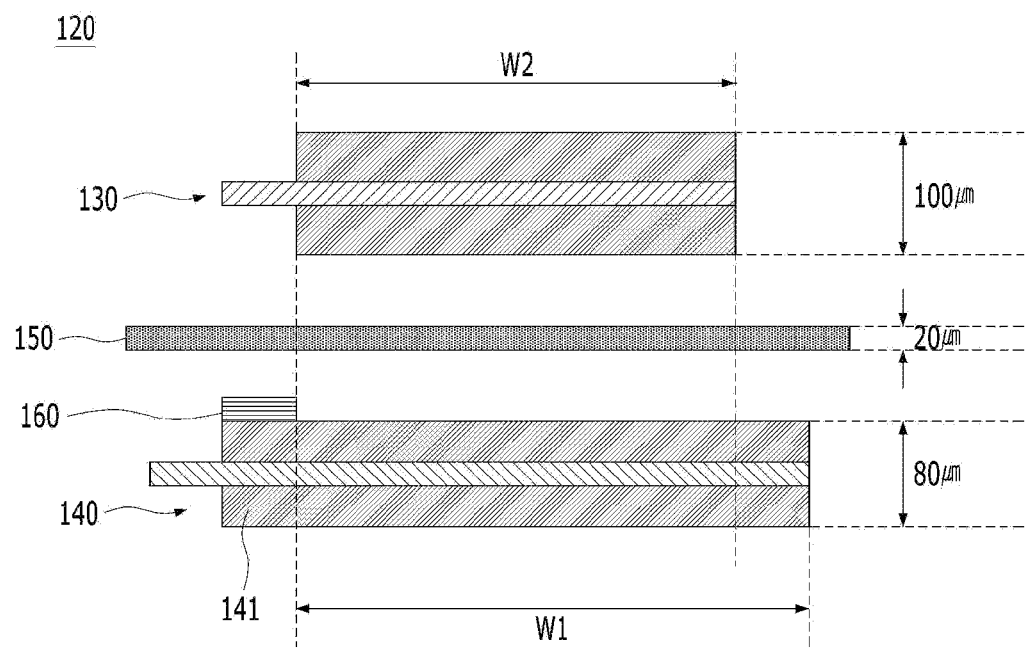

[FIG. 5]
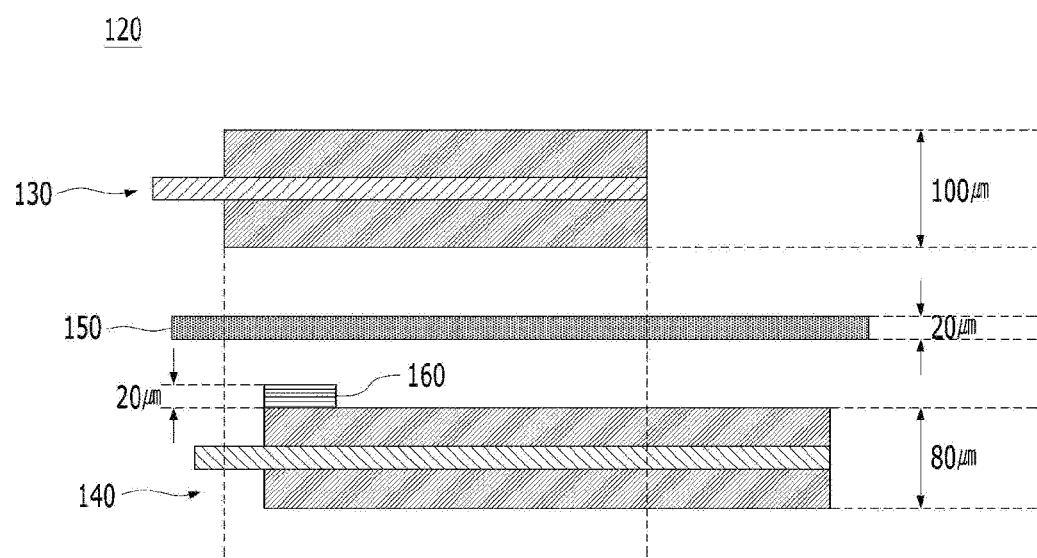

[FIG. 6]
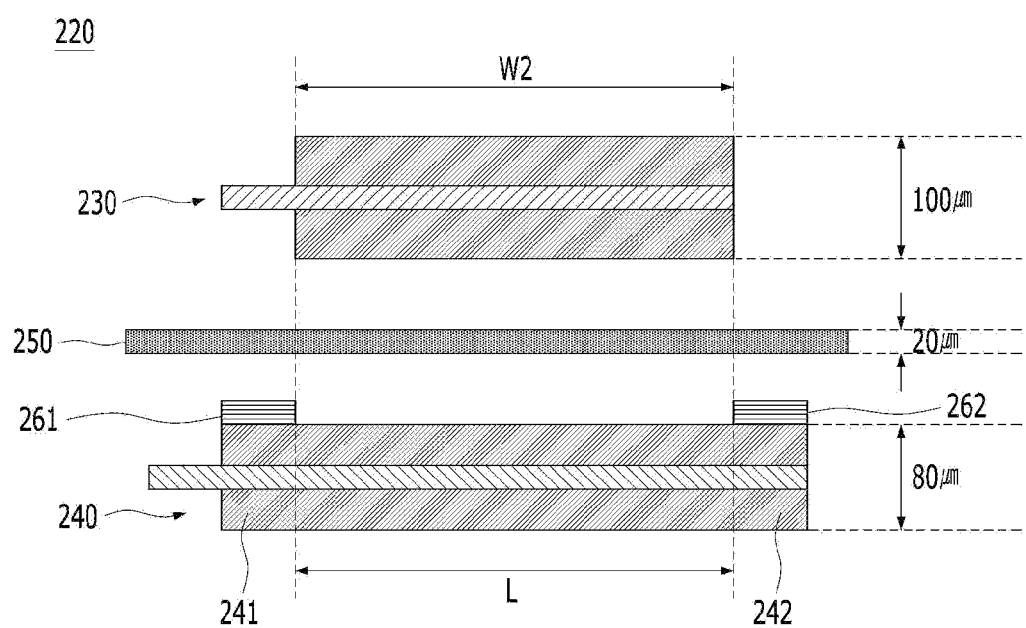

[FIG. 7]
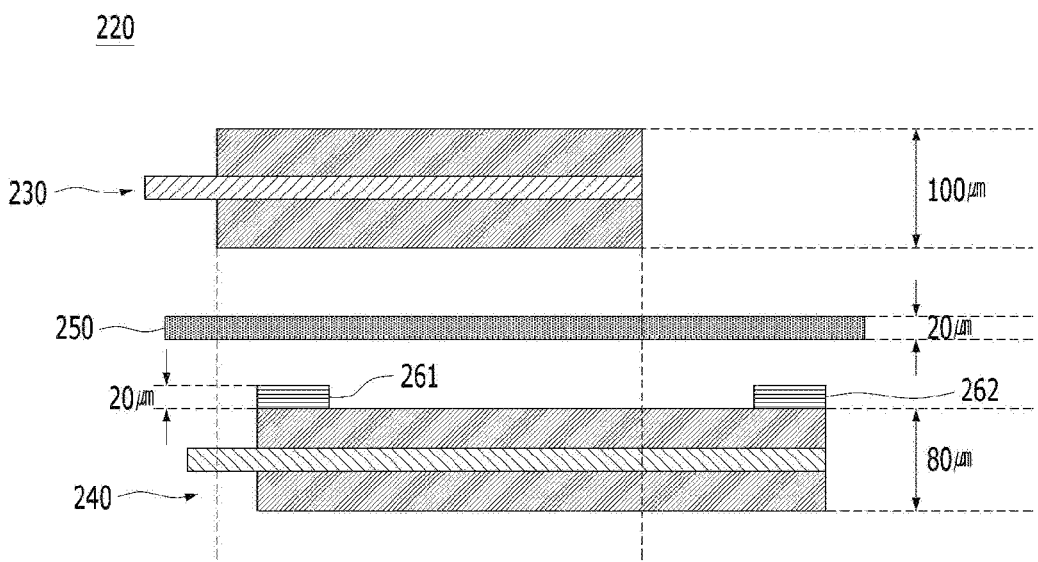

[FIG. 8]
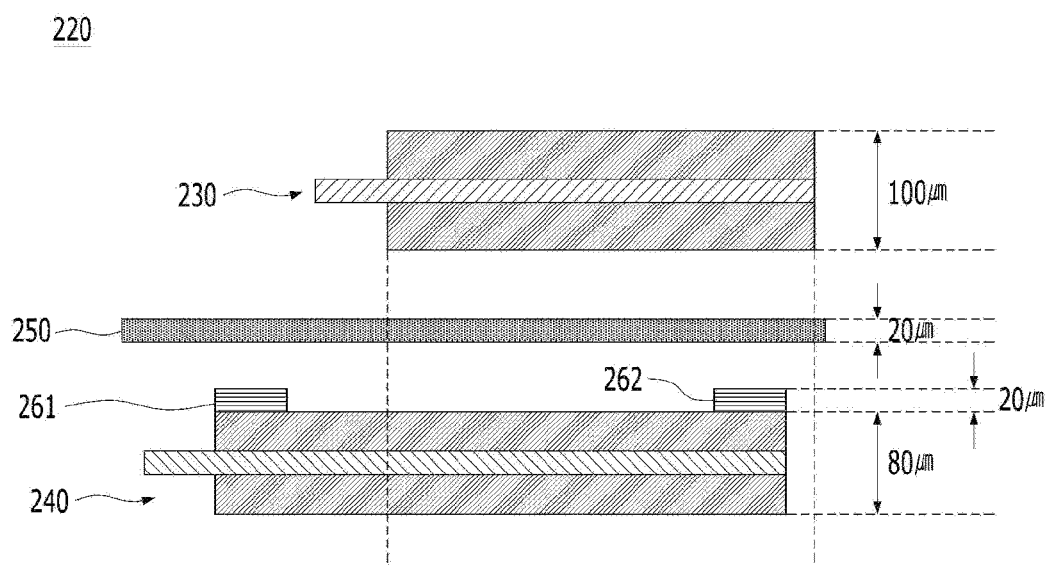

ELECTRODE ASSEMBLY STACKING FAULT DETECTION METHOD, ELECTRODE ASSEMBLY INCLUDING INSULATING MEMBER, AND BATTERY CELL INCLUDING SAME

CROSS-REFERENCE TO RELATED APPLICATIONS

This application is a national phase entry under 35 U.S.C. § 371 of International Application No. PCT/KR2021/012953, filed on Sep. 23, 2021, which claims priority to Korean Patent Application No. 10-2020-0129936, filed on Oct. 8, 2020, the disclosures of which are hereby incorporated by reference in their entirety.

TECHNICAL FIELD

The present disclosure relates to a method of detecting a lamination defect of an electrode assembly, an electrode assembly including an insulating member, and a battery cell including the electrode assembly. This application claims the benefit of priority based on Korean Patent Application No. 10-2020-0129936, filed on Oct. 8, 2020, and the entire contents of the Korean patent application are incorporated herein by reference.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

Herein, as the capacity of the battery increases, the size of the case also increases and the processing of a thin material is drawing attention. As such, the amount of use of pouch-type batteries, which have a structure where a stack-type or stack/folding-type electrode assembly is built in a pouch-type battery case of an aluminum laminate sheet, gradually increases for the reasons of low manufacturing costs, a low weight, and an easy form modification, etc.

FIG. 1 is a schematic diagram showing a conventional electrode manufacturing process, and FIG. 2 is a diagram showing a structure of an electrode assembly.

Referring to FIGS. 1 and 2, in a conventional electrode manufacturing method, an electrode active material layer 2 is formed by applying an electrode slurry containing an electrode active material on a current collector 1, which was then dried and rolled and was then notched to thereby manufacture an electrode. A positive electrode is manufactured by coating a positive electrode slurry containing a positive electrode active material on a positive electrode current collector, and a negative electrode is manufactured by coating a negative electrode slurry containing a negative electrode active material on a negative electrode current collector.

The manufactured positive electrode 13 and negative electrode 14 and the separator 15 are alternately stacked to be manufactured in the form of an electrode assembly 12, which is then built in a battery case, to thereby manufacture a battery cell 10. Further, a normal electrode assembly 12 has a structure that the negative electrode 14 covers the positive electrode 13 as the width and length of the negative electrode 14 is set to be greater than the width and length of the positive electrode 13. However, when manufacturing an electrode assembly 12, as the positive electrode 13 or the negative electrode 14 is positioned at an inappropriate position, a lamination defect phenomenon in which the end of the positive electrode 13 exceeds the end of the negative electrode 14, may occur in the electrode assembly 12. Namely, the overhang phenomenon (A, B) of the positive electrode may occur in the overhang region of the negative electrode 14.

As described above, when a lamination defect phenomenon occurs in the electrode assembly 12, the positive electrode 13 and the negative electrode 14 may directly contact, or lithium precipitate accumulated from the negative electrode 14 according to the charge and discharge may contact the positive electrode, thereby causing a problem such as a short circuit.

Hence, there is a need for a method capable of detecting a lamination defect in the initial stages at the time of manufacturing an electrode assembly.

PRIOR ART LITERATURE

Patent Document

Japanese Patent No. 6703416

DISCLOSURE

Technical Problem

In order to solve the problems of the prior art, the present technology provides a method of detecting a lamination defect of an electrode assembly in the initial stage, an electrode assembly including an insulating member, and a battery cell including the electrode assembly.

Technical Solution

The present technology provides method for detecting a lamination defect of an electrode assembly. In one example, a method for detecting a lamination defect of an electrode assembly according to the present technology includes: forming an insulating member having a predetermined width and a predetermined height in an overhang region of one end or two ends of one surface of a negative electrode; manufacturing an electrode assembly by sequentially laminating a separator and a positive electrode on one surface of the negative electrode; and determining whether there is a lamination defect in the electrode assembly by measuring a thickness of the electrode assembly.

In one example, the forming of the insulating member includes forming an insulating member in an overhang region of one end of one surface of the negative electrode. In a specific example, a width W1 of the negative electrode except for a region, where the insulating member has been formed, corresponds to a width W2 of the positive electrode or is greater than the width W2 of the positive electrode.

In another example, the forming of the insulating member includes forming first and second insulating members in an overhang region of two ends of one surface of the negative electrode. In a specific example, an interval L between first and second insulating members corresponds to a width W2 of the positive electrode or is greater than the width W2 of the positive electrode.

Further, in the method for detecting a lamination defect of an electrode assembly according to the present technology, the determining of whether there is a lamination defect in the electrode assembly includes determining there is a lamination defect in the electrode assembly if the thickness of the electrode assembly exceeds a sum of each thickness of the negative electrode, the separator, and the positive electrode.

In another example, the determining of whether there is a lamination defect in the electrode assembly includes determining that there is no lamination defect in the electrode assembly if the thickness of the electrode assembly corresponds to a sum of each thickness of the negative electrode, the separator, and the positive electrode.

Further, the electrode assembly may have a structure including at least one of a bi-cell unit of a positive electrode/negative electrode/positive electrode structure, or a monocell unit of a positive electrode/negative electrode structure.

Further, the present disclosure provides an electrode assembly. In one example, an electrode assembly according to the present technology has a structure including a negative electrode, a positive electrode and a separator between the negative electrode and the positive electrode, in which the negative electrode has a structure having an insulating member having a predetermined width and a predetermined height in an overhang region of one end or two ends of one surface of the negative electrode.

Further, the present disclosure provides a battery cell including the electrode assembly.

Advantageous Effects

According to a method of detecting a lamination defect of an electrode assembly, an electrode assembly including an insulating member, and a battery cell including the electrode assembly of the present technology, it is possible to easily detect a lamination defect in an electrode assembly by forming an insulating member in an overhang region of a negative electrode and then manufacturing an electrode assembly, and measuring the thickness of the electrode assembly.

Particularly, when manufacturing a battery cell, it is possible to easily detect whether there is a lamination defect in an electrode assembly before injecting an electrolyte solution or performing a packaging procedure.

BRIEF DESCRIPTION OF THE DRAWINGS

FIG. 1 is a schematic diagram showing a conventional electrode manufacturing process.

FIG. 2 is a diagram showing a structure of an electrode assembly.

FIG. 3 is a flowchart showing a method of detecting a lamination defect in an electrode assembly according to the present technology.

FIGS. 4 to 5 are cross-sectional views showing a laminated structure of an electrode assembly including an insulating member in one embodiment of the present invention.

FIGS. 6 to 8 are cross-sectional views showing a laminated structure of an electrode assembly including an insulating member in another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present technology relates to a method of detecting a lamination defect of an electrode assembly, an electrode assembly including an insulating member, and a battery cell including the electrode assembly.

Generally, a positive electrode and a negative electrode having an electrode slurry applied thereon and a separator are alternately stacked to be manufactured in the form of an electrode assembly, which is then built in a battery case, to thereby manufacture a battery cell. Further, a normal electrode assembly has a structure that the negative electrode covers the positive electrode as the width and length of the negative electrode is set to be greater than the width and length of the positive electrode. However, when manufacturing an electrode assembly, as the positive electrode or the negative electrode is positioned at an inappropriate position, a lamination defect phenomenon in which the end of the positive electrode exceeds the end of the negative electrode, may occur in the electrode assembly. In this case, the positive electrode and the negative electrode may directly contact, or lithium precipitate accumulated from the negative electrode according to the charge and discharge may contact the positive electrode, thereby causing a problem such as a short circuit.

As such, the present disclosure provides a method of detecting a lamination defect of an electrode assembly in the initial stage. Particularly, according to a method of detecting a lamination defect of an electrode assembly according to the present technology, it is possible to easily detect a lamination defect in an electrode assembly by forming an insulating member in an overhang region of a negative electrode and then manufacturing an electrode assembly, and measuring the thickness of the electrode assembly.

Hereinafter, a method of detecting a lamination defect of an electrode assembly, an electrode assembly including an insulating member, and a battery cell including the electrode assembly according to the present technology will be described in detail.

FIG. 3 is a flowchart showing a method of detecting a lamination defect in an electrode assembly according to the present technology.

Referring to FIG. 3, a method for detecting a lamination defect of an electrode assembly according to the present technology includes: forming an insulating member having a predetermined width and a predetermined height in an overhang region of one end or two ends of one surface of a negative electrode (S10); manufacturing an electrode assembly by sequentially laminating a separator and a positive electrode on one surface of the negative electrode (S20); and determining whether there is a lamination defect in the electrode assembly by measuring a thickness of the electrode assembly (S30).

In the present technology, the overhang region of a negative electrode means a region corresponding to a predetermined width in one end or two ends of a negative electrode. Specifically, when manufacturing an electrode assembly, the negative electrode covers the positive electrode as the width and length of the negative electrode is set to be greater than the width and length of the positive electrode. At this time, the overhang region of the negative electrode means the region of the negative electrode where the positive electrode is not included when the negative electrode covers the positive electrode. Further, the overhang region of the negative electrode may mean the width of the region where an electrode tab has been arranged or its opposite region.

In the present technology, it is possible to determine whether there is a lamination defect in the electrode assembly by forming an insulating member in an overhang region of the negative electrode, and then measuring the thickness of an electrode assembly which is manufactured by sequentially laminating a negative electrode, a separator and a positive electrode. The specific method of detecting a lamination defect of an electrode assembly will be described later.

In one example, the method of detecting a lamination defect of an electrode assembly according to the present technology includes forming an insulating member having a predetermined width and a predetermined height in an overhang region of one end of one surface of the negative electrode. In a specific example, the insulating member is formed on one surface of the negative electrode using an attaching or coating process, etc.

In one example, the width of the insulating member is in a range of 1 to 500 μm, 5 to 300 μm, 10 to 100 μm, or 10 to 50 μm. Further, the height of the insulating member is in a range of 1 to 500 μm, 5 to 300 μm, 10 to 100 μm, or 10 to 40 μm. However, the width and the height of the insulating member are not limited thereto. The width and the height of the insulating member may be changed according to the structure and the size of the negative electrode and the positive electrode which are laminated at the time of manufacturing an electrode assembly.

Further, when the width of the insulating member is too large, it may be formed to exceed the overhang region of the negative electrode, and thus it is preferable to have an appropriate width. Further, when the height of the insulating member is too large, the height of the insulating member may also be measured even when the electrode assembly is normal. Hence, it is preferable that the height of the insulating member does not exceed the height of the positive electrode active material slurry or positive electrode active material layer.

It is preferable that the insulating member is made of an electrically stable material, and in the negative electrode, the region of the insulating member may be a region where the capacity of a normal battery cell is not manifested. The insulating member may contain polyethylene, polypropylene, polyetherimide, polyacetal, polysulfone, polyetheretherketone, polyester, polyamide, polystyrene, polyethylene terephthalate, polyphenylene, polytetrafluoroethylene, polysiloxane, polyamide, polyvinylidene fluoride, and a copolymer thereof, or a mixture thereof. For example, the insulating member may be formed by coating polyethylene to have a predetermined width and height at the overhang region of one end of a negative electrode.

At this time, a width W1 of the negative electrode except for a region, where the insulating member has been formed, may correspond to a width W2 of the positive electrode or may be greater than the width W2 of the positive electrode. This means that the insulating member is located only on an overhang region of the negative electrode. Generally, the width of the negative electrode is greater than the width of the positive electrode, and in the case that the width W1 of the negative electrode except for the region where the insulating member has been formed is smaller than the width W2 of the positive electrode, the insulating member may be formed to exceed the overhang region of the negative electrode. Further, in the case that the width W1 of the negative electrode except for the region where the insulating member has been formed is smaller than the width W2 of the positive electrode, if the positive electrode is laminated on the upper portion of the negative electrode, the positive electrode may be laminated on the upper portion of the insulating member, and a lamination defect may occur in the electrode assembly.

Further, when the positive electrode is laminated on the upper portion of the negative electrode, if one end of the positive electrode is arranged on an overhang region of the negative electrode or is arranged to exceed the overhang region of the negative electrode where an insulating member has been formed, it may be determined that there is a lamination defect in the electrode assembly.

In another example, the method of detecting a lamination defect of an electrode assembly according to the present technology includes forming first and second insulating members in an overhang region of two ends of one surface of the negative electrode.

At this time, an interval L between first and second insulating members may correspond to a width W2 of the positive electrode or may be greater than the width W2 of the positive electrode. The interval L between the first and second insulating members means the width of the negative electrode except for the region where the insulating member has been formed. As described above, the width of the negative electrode is greater than the width of the positive electrode, and in the case that the width W1 of the negative electrode except for the region where the insulating member has been formed is smaller than the width W2 of the positive electrode, the insulating member may be formed to exceed the overhang region of the negative electrode. Further, in the case that the interval L between the first and second insulating members is smaller than the width W2 of the positive electrode, when the positive electrode is laminated on the upper portion of the negative electrode, the positive electrode may be laminated on the upper portion of the insulating member, and the lamination defect may occur in the electrode assembly.

Further, when the positive electrode is laminated on the upper portion of the negative electrode, if one end of the positive electrode is arranged on an overhang region of the negative electrode or is arranged to exceed the overhang region of the negative electrode where an insulating member has been formed, it may be determined that there is a lamination defect in the electrode assembly.

In one example, a method of detecting a lamination defect of an electrode assembly according to the present technology includes manufacturing an electrode assembly by sequentially laminating a separator and a positive electrode on one surface of a negative electrode having the insulating member formed thereon (S20). Further, it is possible to determine whether there is a lamination defect in the manufactured electrode assembly by measuring the thickness of the manufactured electrode assembly.

The method of detecting a lamination defect of an electrode assembly according to the present technology includes determining whether there is a lamination defect in the electrode assembly by measuring a thickness of the electrode assembly (S30).

In one example, the determining of whether there is a lamination defect in the electrode assembly (S30) includes determining that there is a lamination defect in the electrode assembly if the thickness of the electrode assembly exceeds a sum of each thickness of the negative electrode, the separator, and the positive electrode. As described above, the negative electrode according to the present disclosure has an insulating member at the overhang region of one end. When the positive electrode is laminated on the overhang region of the negative electrode active material layer, the positive electrode is laminated on the upper portion of the insulating member. As such, when thickness of the electrode assembly is measured, the thickness of the insulating member may also be measured. As such, the thickness of the electrode assembly having a lamination defect may exceed the sum of the thickness of each of the negative electrode, the separator and the positive electrode. Namely, when the thickness of the manufactured electrode assembly exceeds the sum of each thickness of the negative electrode, the separator and the positive electrode, it is determined that there is a lamination defect in the electrode assembly.

For example, in the case that the thickness of each of the negative electrode, the separator and the positive electrode is 80 μm, 20 μm, and 100 μm, if the thickness of the manufactured electrode assembly exceeds 200 μm, it is determined that that is a lamination defect in the manufactured electrode assembly.

In another example, the determining of whether there is a lamination defect in the electrode assembly (S30) includes determining that there is no lamination defect in the electrode assembly if the thickness of the electrode assembly corresponds to a sum of each thickness of the negative electrode, the separator, and the positive electrode. This means that the positive electrode is laminated on the upper portion of the negative electrode, it is laminated on a region where the insulating member has not been formed.

For example, in the case that the thickness of each of the negative electrode, the separator and the positive electrode is 80 μm, 20 μm, and 100 μm, if the thickness of the manufactured electrode assembly is 200 μm, it is determined that that is no lamination defect in the manufactured electrode assembly.

In one example, the electrode assembly may have a structure including at least one of a bi-cell unit of a positive electrode/negative electrode/positive electrode structure, or a mono-cell unit of a positive electrode/negative electrode structure. In a specific example, an electrode assembly may be a mono-cell of a positive electrode/separator/negative electrode, and the mono-cell has a separator interposed between the positive electrode and the negative electrode. Further, the separator may have a structure protruding from the positive electrode and the negative electrode because the area of the separator is greater than the area of the positive electrode and the negative electrode.

As described above, according to the present technology, it is possible to easily determine whether there is a lamination defect in the electrode assembly by measuring only the thickness of the laminated electrode assembly.

Particularly, according to the present technology, it is possible to measure the thickness of the electrode assembly by only laminating a negative electrode and a positive electrode, and it is possible to easily detect whether there is a lamination defect in an electrode assembly before injecting an electrolyte solution or performing a packaging procedure.

Further, the present disclosure provides an electrode assembly. More specifically, the present disclosure relates to an electrode assembly having a structure including a negative electrode, a positive electrode and a separator between the negative electrode and the positive electrode, in which the negative electrode has a structure having an insulating member having a predetermined width and a predetermined height in an overhang region of one end or two ends of one surface of the negative electrode.

As described above, since the negative electrode includes an insulating member, it is possible to detect a lamination defect in the initial stages at the time of manufacturing an electrode assembly.

In the present technology, the positive electrode has a structure in which a positive electrode mixture layer is stacked on one or both sides of a positive electrode current collector. In one example, the positive electrode mixture layer includes a positive electrode active material, a conductive material and a binder polymer, etc. and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2$ $(0.5<x<1.3, 0<y<1)$, $Li_xNi_{1-y}Mn_yO_2(0.5<x<1.3, 0<y<1)$, Li$_x$(Ni$_a$Co$_b$Mn$_c$)O$_4$ (0.5<x<1.3, 0<a<2, 0<b<2, 0<c<2, a+b+c=2), Li$_x$Mn$_{2-z}$Ni$_z$O$_4$ (0.5<x<1.3, 0<z<2), Li$_x$Mn$_{2-z}$Co$_z$O$_4$ (0.5<x<1.3, 0<z<2), Li$_x$CoPO$_4$ (0.5<x<1.3) and Li$_x$FePO$_4$ (0.5<x<1.3), and the lithium-containing transition metal oxide may be coated with a metal or metal oxide such as aluminum (Al). Further, in addition to the lithium-containing transition metal oxide, one or more of sulfide, selenide, and halide may be used.

The positive electrode according to the present technology can be applied to various types of lithium secondary batteries, but is preferably used for high-power batteries. The positive electrode active material layer of the present technology is applied to a high content nickel (High-Ni)-based NCM battery.

In a specific example, the positive electrode active material layer according to the present technology includes an active material component having a structure represented by Chemical Formula 1 or Chemical Formula 2 below.

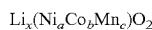  [Chemical formula 1]

(In the above chemical formula 1, 0.5<x<1.3, 0.5<a<1, 0<b<0.25, 0<c<0.25, and a+b+c=1).

In Chemical Formula 1, the value "a" is 0.6 or more, specifically 0.8 or more. In the Formula 1, as the value "a" increases, the value "b" and/or value "c" decrease within the range satisfying the above Formula 1. Through this, the positive electrode for a lithium secondary battery according to the present technology is applied to a high-Ni-based NCM secondary battery.

  [Chemical formula 2]

(In the above chemical formula 2, 0.5<x<1.3, 0.6<a<1, 0<b<0.2, 0<c<0.1, 0<d<0.1, and a+b+c+d=1).

In the Chemical Formula 2, "a" is equal to or greater than 0.6, specifically, equal to or greater than 0.8, and more specifically, equal to or greater than 0.83.

The NCM secondary battery may be, for example, NCM 622, NCM 651520, NCM 712 or NCM 811 (Ni≥80%). In the case of NCMA, the output is high while maintaining stability as in NCM by adding aluminum while not reducing the cobalt ratio.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode active material may be included in the range of 90.0 to 98.5 wt % in the positive electrode mixture layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

The positive electrode mixture layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; polyphenylene derivative, and carbon nano tube (CNT) may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The binder polymer content is proportional to the conductive material content included in the positive electrode mixture layer. This is to impart adhesion to conductive materials whose particle size is relatively small compared to the active material and is because when the content of the conductive material increases, more binder polymer is required, and when the content of the conductive material decreases, less binder polymer can be used.

Further, the negative electrode may include a negative electrode current collector, and a mixture layer of a double layer structure formed on the negative electrode current collector.

Non-limiting examples of the current collector used for the negative electrode include copper, gold, nickel, or a foil manufactured by a copper alloy or a combination thereof. In addition, the current collector may be used by stacking substrates made of the above materials.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra-high molecular weight polyethylene, and a membrane in which polyolefin-based polymers, such as polypropylene, polybutylene, or polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric.

The structure of the nonwoven fabric may be a spunbonded nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

The electrolyte solution may contain an organic solvent and an electrolyte salt, and the electrolyte salt is a lithium salt. Those conventionally used in the electrolyte solution for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the electrolyte solution described above, those conventionally used in electrolyte solutions for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof.

These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone or a mixture of two or more of them, but the present invention is not limited thereto.

The injection of the non-aqueous electrolyte may be performed at an appropriate step in the manufacturing process of the secondary battery, depending on the manufacturing process and required physical properties of the final product.

Further, the present disclosure provides a battery cell including an electrode assembly. If the battery cell is a secondary battery capable of charging and discharging, it is not particularly limited. The battery cell may be a pouch-type battery cell or a cylindrical battery cell.

In a specific example, the battery cell may be a pouch-type battery cell. For example, the battery cell is a pouch type unit cell, and an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

Detailed Description of the Preferred Embodiments

Hereinafter, the present invention will be described in more detail through drawings and examples. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

FIGS. 4 to 5 are cross-sectional views showing a laminated structure of an electrode assembly including an insulating member in one embodiment of the present invention.

Referring to FIG. 4, an electrode assembly 120 according to the present technology is manufactured by sequentially laminating a negative electrode 140, a separator 150 and a positive electrode 130. At this time, an insulating member 160 is formed on the overhang region 141 of one end of one surface of the negative electrode 140.

Further, in the present technology, the width W1 of the negative electrode except for the region where the insulating member 160 has been formed is greater than the width W2 of the positive electrode. Further, when the positive electrode 130 is laminated on the upper portion of the negative electrode 140, if one end of the positive electrode 130 is arranged on an overhang region 141 of the negative electrode 140 or is arranged to exceed the overhang region 141 of the negative electrode 140, it is determined that there is a lamination defect in the electrode assembly 120.

In the present technology, it is determined whether there is a lamination defect in the electrode assembly 120 by measuring the thickness of the electrode assembly 120 which is manufactured by sequentially laminating the negative electrode 140, the separator 150, and the positive electrode 130. Further, the thickness of the electrode assembly 120 is measured by measuring the thickness of the region where the insulating member 160 is positioned. Specifically, as illustrated in FIG. 4, when measuring the thickness of the electrode assembly 120 which is manufactured by sequentially laminating the negative electrode 140, the separator 150, and the positive electrode 130, the thickness of the electrode assembly becomes 200 μm. At this time, the thickness of each of the negative electrode 140, the separator 150 and the positive electrode 130 is 80 μm, 20 μm and 100 μm. The thickness of the electrode assembly 120 corresponds to the sum of the thickness of each of the negative electrode 140, the separator 150 and the positive electrode 130. As such, it can be determined that there is no lamination defect in the electrode assembly 120.

As illustrated in FIG. 5, when measuring the thickness of the electrode assembly 120 which is manufactured by sequentially laminating the negative electrode 140, the separator 150, and the positive electrode 130, the thickness of the electrode assembly becomes 220 μm. At this time, the thickness of each of the negative electrode 140, the separator 150 and the positive electrode 130 is 80 μm, 20 μm and 100 μm. The thickness of the electrode assembly 120 exceeds the sum of the thickness of each of the negative electrode 140, the separator 150 and the positive electrode 130. As such, it can be determined that there is a lamination defect in the electrode assembly 120.

Specifically, in the present technology, an insulating member 160 is formed in an overhang region 141 of one end of the negative electrode 140, and the positive electrode 130 is stacked on the overhang region 141 of the negative electrode, and when the thickness of the electrode assembly 120 is measured, the thickness of the insulating member 160 is also measured. As such, the thickness of the electrode assembly 120 may exceed the sum of the thickness of each of the negative electrode 140, the separator 150 and the positive electrode 130.

As described above, according to the present technology, it is possible to easily determine whether there is a lamination defect in the electrode assembly by measuring only the thickness of the laminated electrode assembly.

Second Embodiment

FIGS. 6 to 8 are cross-sectional views showing a laminated structure of an electrode assembly including an insulating member in another embodiment of the present invention.

Referring to FIG. 6, an electrode assembly 220 according to the present technology is manufactured by sequentially laminating a negative electrode 240, a separator 250 and a positive electrode 230. At this time, first and second insulating members 261 and 262 are formed on the overhang regions 241 and 242 of two ends of one surface of the negative electrode 240.

Further, in the present technology, an interval L between first and second insulating members 261 and 262 corresponds to a width W2 of the positive electrode or is greater than the width W2 of the positive electrode. Further, when the positive electrode 230 is laminated on the upper portion of the negative electrode 240, if one end of the positive electrode 230 is arranged on overhang regions 241 and 242 of the negative electrode 240 or is arranged to exceed the overhang regions 241 and 242 of the negative electrode 240, it is determined that there is a lamination defect in the electrode assembly 220.

In the present technology, it is determined whether there is a lamination defect in the electrode assembly 220 by measuring the thickness of the electrode assembly 220 which is manufactured by sequentially laminating the negative electrode 240, the separator 250, and the positive electrode 230. Further, the thickness of the electrode assembly 220 is measured by measuring the thickness of the region where the insulating member 261, 262 is positioned. Specifically, as illustrated in FIG. 6, when measuring the thickness of the electrode assembly 220 which is manufactured by sequentially laminating the negative electrode 240, the separator 250, and the positive electrode 230, the thickness of the electrode assembly becomes 200 μm. At this time, the thickness of each of the negative electrode 240, the separator 250 and the positive electrode 230 is 80 μm, 20 μm and 100 μm. The thickness of the electrode assembly 220 corresponds to the sum of the thickness of each of the negative electrode 240, the separator 250 and the positive electrode 230. As such, it can be determined that there is no lamination defect in the electrode assembly 220.

As illustrated in FIG. 7, when measuring the thickness of the electrode assembly 220 which is manufactured by sequentially laminating the negative electrode 240, the separator 250, and the positive electrode 230, the thickness of the electrode assembly becomes 220 μm. At this time, the thickness of each of the negative electrode 240, the separator 250 and the positive electrode 230 is 80 μm, 20 μm and 100 μm. The thickness of the electrode assembly 220 exceeds the sum of the thickness of each of the negative electrode 240, the separator 250 and the positive electrode 230. As such, it can be determined that there is a lamination defect in the electrode assembly 220.

Specifically, in the present technology, an insulating member 261 is formed in an overhang region 241 of one end of the negative electrode 240, and the positive electrode 230 is stacked on the overhang region 241 of the negative electrode, and when the thickness of the electrode assembly 220 is measured, the thickness of the insulating member 261 is also measured. As such, the thickness of the electrode assembly 220 may exceed the sum of the thickness of each of the negative electrode 240, the separator 250 and the positive electrode 230.

Further, as shown in FIG. 8, an insulating member 262 is formed in an overhang region 242 of the other end of the negative electrode 240, and the positive electrode 230 is stacked on the overhang region 242 of the negative electrode, and when the thickness of the electrode assembly 220 is measured, the thickness of the insulating member 262 is also measured. As such, the thickness of the electrode assembly 220 may exceed the sum of the thickness of each of the negative electrode 240, the separator 250 and the positive electrode 230.

Hence, when measuring the thickness of the electrode assembly 220 which is manufactured by sequentially laminating the negative electrode 240, the separator 250, and the positive electrode 230, the thickness of the electrode assembly becomes 220 μm. The thickness of the electrode assembly 220 exceeds the sum of the thickness of each of the negative electrode 240, the separator 250 and the positive electrode 230. As such, it can be determined that there is a lamination defect in the electrode assembly 220.

As described above, according to the present technology, it is possible to easily determine whether there is a lamination defect in the electrode assembly by measuring only the thickness of the laminated electrode assembly.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

1: current collector
2: electrode active material
10: battery cell
11: electrode case 12, 120, 220: electrode assembly
13, 130, 230: positive electrode
14, 140, 240: negative electrode
15, 150, 250: separator
160: insulating member
261: first insulating member
262: second insulating member

The invention claimed is:

1. A method for detecting a lamination defect of an electrode assembly, the method comprising:
    forming an insulating member having a predetermined width and a predetermined height in an overhang region of one end or two ends of one surface of a negative electrode;
    manufacturing an electrode assembly by sequentially laminating, along a stacking direction, a separator and a positive electrode on one surface of the negative electrode, wherein the separator, the positive electrode, and the negative electrode each define respective planes extending perpendicularly to the stacking direction; and
    determining whether there is a lamination defect in the electrode assembly by measuring a thickness of the electrode assembly,
    wherein the lamination defect includes a portion of the positive electrode overlapping at least a portion of the insulating member.

2. The method of claim 1, wherein the forming of the insulating member includes forming the insulating member in the overhang region of one end of the one surface of the negative electrode.

3. The method of claim 1, wherein a width W1 of the negative electrode except for a region where the insulating member has been formed, corresponds to a width W2 of the positive electrode or is greater than the width W2 of the positive electrode.

4. The method of claim 1, wherein the forming of the insulating member includes forming first and second insulating members in the overhang region of two ends of the one surface of the negative electrode.

5. The method of claim 4, wherein an interval L between the first and the second insulating members corresponds to a width W2 of the positive electrode or is greater than the width W2 of the positive electrode.

6. The method of claim 1, wherein the determining of whether there is a lamination defect in the electrode assembly includes determining there is a lamination defect in the electrode assembly if the thickness of the electrode assembly exceeds a sum of each thickness of the negative electrode, the separator, and the positive electrode.

7. The method of claim 1, wherein the determining of whether there is a lamination defect in the electrode assembly includes determining that there is no lamination defect in the electrode assembly if the thickness of the electrode assembly corresponds to a sum of each thickness of the negative electrode, the separator, and the positive electrode.

8. The method of claim 1, wherein the electrode assembly has a structure including at least one of a bi-cell unit of a positive electrode/negative electrode/positive electrode structure, or a monocell unit of a positive electrode/negative electrode structure.

9. An electrode assembly having a structure including a negative electrode, a positive electrode and a separator between the negative electrode and the positive electrode, wherein the separator, the positive electrode, and the negative electrode are sequentially laminated along a stacking direction,
    wherein the negative electrode has a structure having an insulating member having a predetermined width and a predetermined height in an overhang region of one end or two ends of one surface of the negative electrode, and
    wherein the separator, the positive electrode, and the negative electrode each define respective planes extending perpendicularly to the stacking direction.

10. A battery cell including electrode leads and the electrode assembly according to claim 9.

11. The electrode assembly according to claim 9, wherein a width W1 of the negative electrode except for a region where the insulating member has been formed, corresponds to a width W2 of the positive electrode or is greater than the width W2 of the positive electrode.

12. A method for detecting a lamination defect of an electrode assembly, the method comprising: forming an insulating member having a predetermined width and a predetermined height in an overhang region of one end or two ends of one surface of a negative electrode; manufacturing an electrode assembly by sequentially laminating a separator and a positive electrode on one surface of the negative electrode; and determining whether there is a lamination defect in the electrode assembly by measuring a thickness of the electrode assembly; wherein a width W1 of the negative electrode except for a region where the insulating member has been formed, corresponds to a width W2 of the positive electrode or is greater than the width W2 of the positive electrode.

13. The method of claim 12, wherein the forming of the insulating member includes forming the insulating member in the overhang region of one end of the one surface of the negative electrode.

14. The method of claim 12, wherein the forming of the insulating member includes forming first and second insulating members in the overhang region of two ends of the one surface of the negative electrode.

15. The method of claim 14, wherein an interval L between the first and the second insulating members corresponds to a width W2 of the positive electrode or is greater than the width W2 of the positive electrode.

16. The method of claim 12, wherein the determining of whether there is a lamination defect in the electrode assembly includes determining there is a lamination defect in the electrode assembly if the thickness of the electrode assembly exceeds a sum of each thickness of the negative electrode, the separator, and the positive electrode.

17. The method of claim 12, wherein the determining of whether there is a lamination defect in the electrode assembly includes determining that there is no lamination defect in the electrode assembly if the thickness of the electrode assembly corresponds to a sum of each thickness of the negative electrode, the separator, and the positive electrode.

18. The method of claim 12, wherein the electrode assembly has a structure including at least one of a bi-cell unit of a positive electrode/negative electrode/positive electrode structure, or a monocell unit of a positive electrode/negative electrode structure.

* * * * *